United States Patent [19]
Nygård

[11] Patent Number: 5,656,818
[45] Date of Patent: Aug. 12, 1997

[54] ELECTRONIC RADIATION IMAGING SYSTEM

[75] Inventor: Einar Nygård, Oslo, Norway

[73] Assignee: Integrert Detektor Og Elektronikk AS, Oslo, Norway

[21] Appl. No.: 491,989

[22] PCT Filed: Jan. 18, 1994

[86] PCT No.: PCT/NO94/00014

§ 371 Date: Jul. 17, 1995

§ 102(e) Date: Jul. 17, 1995

[87] PCT Pub. No.: WO94/16521

PCT Pub. Date: Jul. 21, 1994

[30] Foreign Application Priority Data

Jan. 18, 1993 [NO] Norway .................. 93 0164

[51] Int. Cl.$^6$ .................................................. G01T 1/24
[52] U.S. Cl. .................................................. 250/370.09
[58] Field of Search ........................... 250/370.09, 370.1

[56] References Cited

U.S. PATENT DOCUMENTS

| | | | |
|---|---|---|---|
| Re. 30,904 | 4/1982 | Miller et al. | 250/370.09 |
| 3,812,361 | 5/1974 | Prag et al. | 250/370.09 |
| 4,163,991 | 8/1979 | Burrig . | |
| 4,529,882 | 7/1985 | Lee | 250/370.09 |
| 5,045,685 | 9/1991 | Wall | 250/208.1 |
| 5,153,421 | 10/1992 | Tandon et al. | 250/208.1 |

FOREIGN PATENT DOCUMENTS 0-026904  4/1981  European Pat. Off. .

59-226569  12/1984  Japan .

*Primary Examiner*—Carolyn E. Fields

[57] ABSTRACT

A radiation imaging system includes a detector unit and a receiver unit. The detector unit includes a two-dimensional sensor, first and second amplifier channels, first and second multiplicity generators and first and second address generators. The two-dimensional sensor includes first and second sensing elements wherein the first sensing elements sense radiation in a first direction and the second sensing elements sense radiation in a second direction. The first amplifier channels corresponding to each of the first sensing elements. Each first amplifier channel generates an output signal based on a detection output from a corresponding one of the first sensing elements. The first multiplicity generator generates a first multiplicity signal representing a number of the first amplifier channels generating output signals. The first address generator generates a first analog address of a first amplifier channel associated with a received output signal. The second amplifier channels, second multiplicity generator and second address generator operate in a similar manner to the first amplifier channels, first multiplicity generator and first address generator, but with respect to the second sensing elements. The receiver unit includes converters for converting the first and second analog addresses into first and second digital addresses. The receiver Unit also includes a tester for testing whether the first and second digital addresses represent a valid position address in the first and second direction based on the first and second multiplicity signals.

22 Claims, 4 Drawing Sheets

SIGNAL CHANNEL u
SIGNAL CHANNEL v
SIGNAL CHANNEL w

Fig. 4B

TRIGGER CHANNEL u
TRIGGER CHANNEL v
TRIGGER CHANNEL w

Fig. 4C

MULTIPLICITY

Fig. 4D

DATA ON ADDRESS BUS

Fig. 4E

NON-OVER-LAPPING ADDRESSES f: THRESHOLD VOLTAGE

ELECTRONIC RADIATION IMAGING SYSTEM

BACKGROUND OF THE INVENTION

1. Field of the Invention

The invention concerns an electronic radiation imaging system. More specifically the invention concerns an electronic system for imaging by means of X-rays or another type of electromagnetic radiation and its use in certain radiation imaging applications.

2. Description of Related Art

Radiation imaging by means of X-rays has normally used film to record the radiation after, e.g., X-ray exposure of the object of which an image has to be obtained and also in order to provide the imaging directly. In recent years electronic detectors have been employed in order to record the radiation and display the image graphically on a display unit, e.g. a cathode ray tube. The electronic detectors are, e.g., based on photo-conductive or other photo-electric components. The latest technique for radiation imaging has adopted charge-coupled devices.

From U.S. Pat. No. 3,812,361 there is known a device for providing radiation imaging by means of gamma rays. This device is based on a detector with electrode stripes arranged in parallel on the front and back respectively of a sheet of semi-conductor material. The stripes on the front extend in a direction which forms an angle with the stripes on the back. This angle may, e.g., be 90 degrees, thus making the electrode stripes on each of the sides mutually orthogonal. A gamma ray, i.e. a photon, which passes through an electrode on the front and the back respectively will thereby indicate a precise position, viz. an x,y position, which is the point of intersection between the electrode concerned at the front and the back respectively.

The most advanced method for performing electromagnetic radiation imaging electronically is based on charge-coupled components. These form a matrix of detection elements which permit a precise determination of the position of a radiation event. One disadvantage is that charge-coupled components have a dissipation depth, i.e. a sensitivity range, which in todays commercial system is only 15 μm thick. Since X-rays normally have very high energy, they will easily pass through the semi-conductor material, e.g. silicon. The sensitivity of the detector, however, is dependent on the interception of as large a percentage of the X-rays as possible and it will require a much thicker dissipation depth. That part of the radiation which passes through the detector cannot be used to form an image and that means that the radiation dose which is necessary in order to provide an image of a given quality can be lower in a detector with higher sensitivity i.e. thicker dissipation depth. Another disadvantage of charge-coupled components is that they have difficulty in detecting the absorption of individual photons, since the recording of such a detection will be masked by noise during the read-out and thereby be dependent on the energy of the photon. This disadvantage can be mitigated to some extent by having the radiation integrated over time by a detector based on charge-coupled components. However, the integration time is limited, since a charge-coupled component will only be capable of performing such an integration during a limited period of time. If the integration time is too long, the charge will leak to earth and it will also be impossible to perform a reading of a detector based on charge-coupled components at random times.

SUMMARY OF THE INVENTION

An object of the present invention is therefore to provide an electronic radiation imaging system which eliminates the above-mentioned disadvantages and in addition can provide very good protection against noise.

These objects are achieved with an electronic radiation imaging system comprising a detector unit, the detector unit including, a two-dimensional sensor with first and second sensing elements, the first sensing elements sensing radiation in a first direction and the second sensing elements sensing radiation in a second direction, first amplifier channels corresponding to each of the first sensing elements, each first amplifier channel generating an output signal based on a detection output from a corresponding one of the first sensing elements, second amplifier channels corresponding to each of the second sensing elements, each second amplifier channel generating an output signal based on a detection output from a corresponding one of the second sensing elements, a first multiplicity generator connected to each of the first amplifier channels, and generating a first multiplicity signal representing a number of the first amplifier channels generating output signals, a second multiplicity generator connected to each of the second amplifier channels, and generating a second multiplicity signal representing a number of the second amplifier channels generating output signals, a first address generator receiving the output signals from each of the first amplifier channels, and generating a first analog address of a first amplifier channel associated with a received output signal, a second address generator receiving the output signals from each of the second amplifier channels, and generating a second analog address of a second amplifier channel associated with a received output signal; and a receiver unit, the receiver unit including, converting means for converting the first analog address into a first digital address, and converting the second analog address into a second digital address, and testing means for testing whether the first and second digital addresses represent a valid position address in the first and second direction based on the first and second multiplicity signals.

BRIEF DESCRIPTION OF THE DRAWINGS

The invention will now be described in more detail with reference to the drawing.

DETAILED DESCRIPTION OF THE PREFERRED EMBODMENTS

Figure 1:
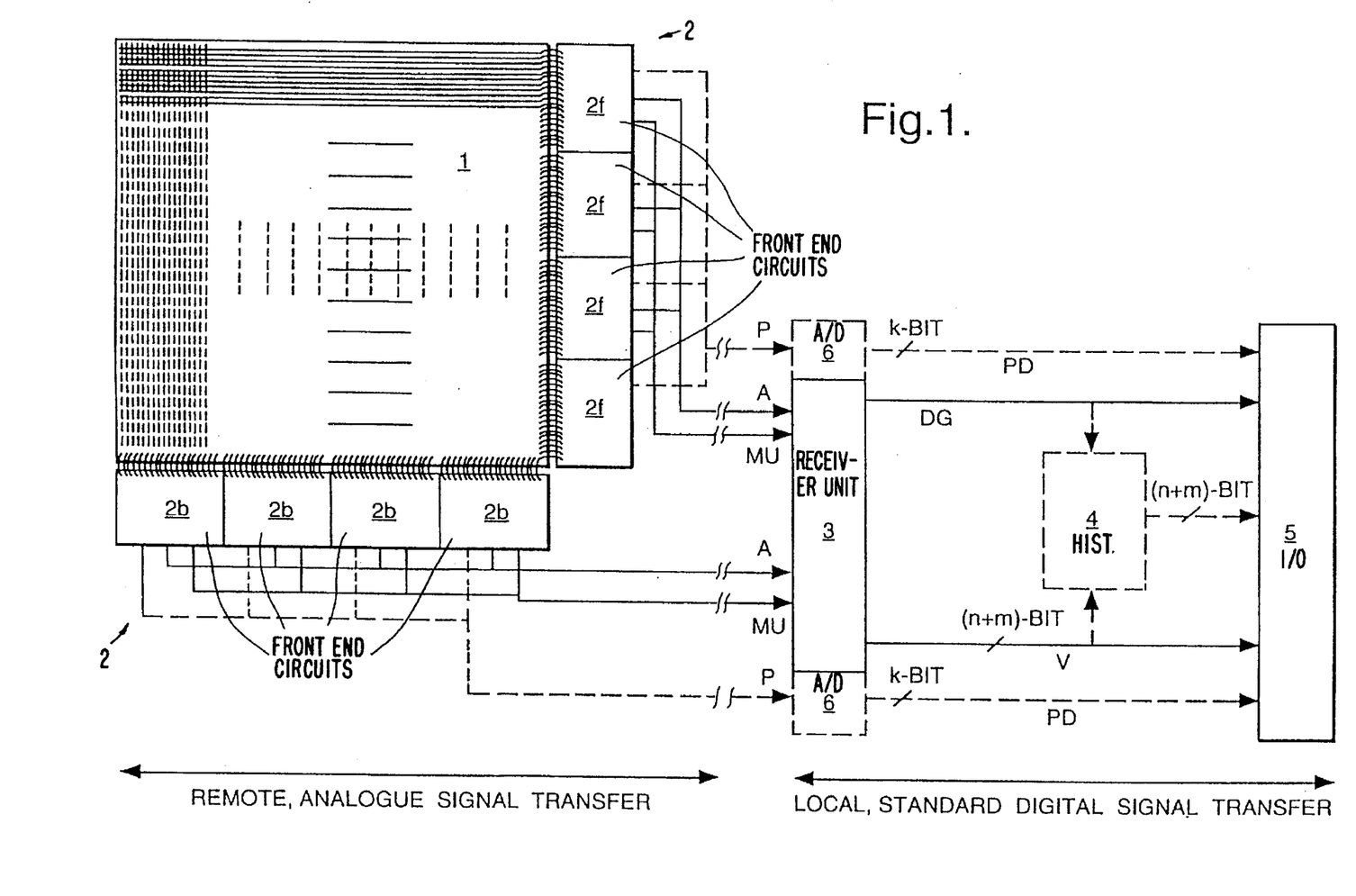
FIG. 1 is a design of a complete electronic radiation imaging system according to the present invention.

FIG. 1 illustrates an electronic radiation imaging system according to the present invention. A sensor element 1 is made of semi-conductor material and has parallel stripes arranged on the front and back respectively and preferably in such a manner that the parallel stripes on each of the sides are mutually orthogonal. The semi-conductor material in the detector element may preferably be silicon. Each of the stripe intersections constitutes a diode which is biased in the reverse direction. When, e.g. a charged particle or electromagnetic ray (photons) is absorbed in the detector, an electrical signal is created in the semiconductor and recorded by a stripe structure on the front and a stripe structure on the back respectively. This gives an x,y position for the point in the detector where the coincident absorption event takes place.

Each of the stripe structures constitutes a detection channel which is connected with electronic front-end circuits 2. There can, e.g., be such a front-end circuit 2 for all the stripe structures in the x direction, i.e. on the front of the detector element 1 and a front-end circuit for all strip diodes in the y direction, i.e. on the back of the detector element 1. However, as shown in FIG. 1, the front-end. circuits can also be composed of a number of separate circuits 2b; 2f. The front-end circuits consist of a number of parallel amplifier channels 10. If, e.g., there are M stripe structures in the x direction and N stripe structures in the y direction, the number of parallel amplifier channels is M+N and divided between two or more front-end circuits 2b and 2f respectively in the x direction and the y the amplifier channels 10 is adapted,i.e. equal to the width of the stripe direction respectively. The front-end circuits 2b; 2f are provided together with the detector 1 and preferably provided on the same hybrid chip. The width of structures.

Figure 2:
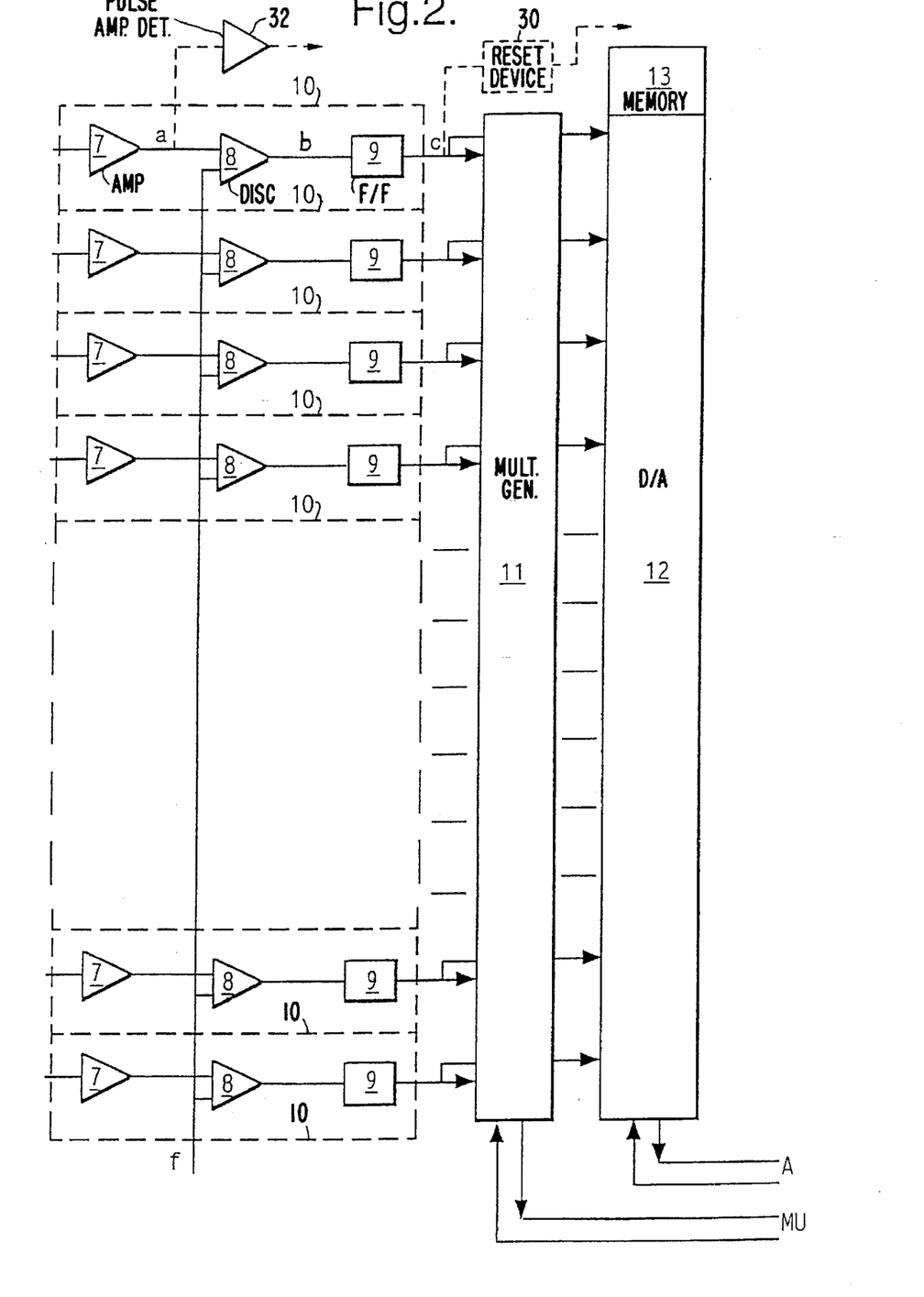
FIG. 2 shows details of the electronics in the detector unit.
Figure 4A:
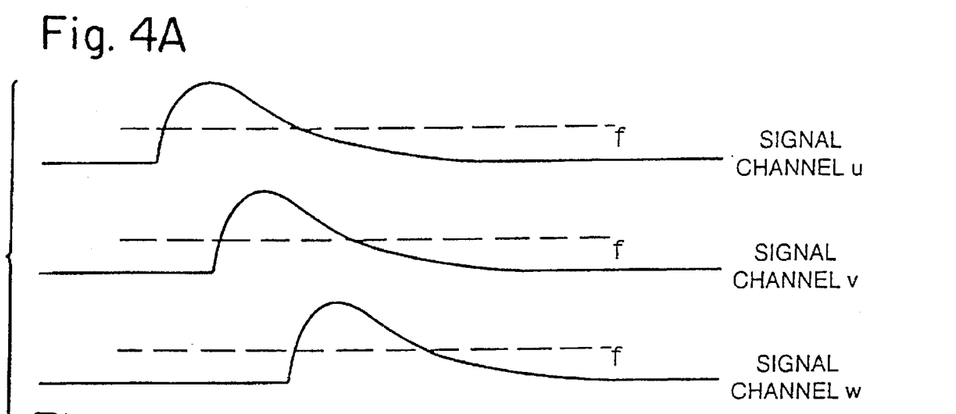
FIGS. 4A–4E shows signal forms formed at different stages of the electronic radiation imaging system during approximate coincidence of three events or photons in, e.g. an x direction in the detector.

The design of the front-end circuits 2b; 2f is illustrated in more detail in FIG. 2. Each front-end circuit is monolithically integrated and comprises as illustrated in FIG. 2 an amplifier 7 connected to a first input of a discriminator 8 whose second input receives a signal f for adjustment of the discriminator's threshold voltage. The output of the discriminator 8 is connected to an input of a monostable flip-flop 9. A monolithic integrated circuit comprises a plurality of amplifier channels 10. The output of the monostable flip-flop 9 is connected to inputs of a multiplicity generator 11 and inputs of a digital/analog converter 12 respectively. Furthermore the digital/analog converter 12 can be connected to a memory 13, e.g. in the form of a read-only memory which contains a circuit address. This will be relevant if the front-end electronics as mentioned consists of several circuits which each then receives its own address stored in the memory 13. The discriminator 8 and the flip-flop 9 together form the comparator of an amplifier channel. The output of the flip-flop 9 can be connected to a reset device 30 such that the system may be reset after a certain time. In each amplifier channel 10 there can also be provided, between the amplifier 7 and the comparator 8,9, a pulse amplitude detector 32 which detects the pulse amplitude of the output signal from the amplifier 7 in the form of an analog pulse amplitude signal which is output on a separate pulse amplitude output. For ease of illustration, FIG. 2 illustrates the reset device 30 and the pulse amplitude detector 32 for only one amplifier channel 10. The pulse amplitude output is illustrated in FIG. 1 and indicated by P. The pulse amplitude signal P is in analog form and thus does not need to be converted in the front-end circuit's digital/analog converter 12, but makes it necessary to use the above-mentioned reset device. The signal processing in the front-end circuits, i.e. in each amplifier channel 10, will now be described in more detail with reference to FIGS. 1 and 4A–4E respectively. The amplifier 7 in each channel produces a signal a as shown in FIG. 4A. The signal a may have the form of an approximately harmonic pulse with a steep leading edge and a much more slowly falling trailing edge. In FIG. 4A there are illustrated 3 events, i.e. an approximately coincident detection in three channels u, v and w in, e.g., an x direction. The set threshold value f of the discriminator 8 is illustrated by a dotted line. When the pulse value exceeds the threshold value, the output signal b from the discriminator causes the monostable flip-flop 3 in FIG. 2 to produce a square pulse c of a predetermined duration. These trigger pulses c are similarly shown for each of the channels u, v, w in, e.g., an x direction in FIG. 4B and represent the same three approximately coincident events which cause signal A to be produced by the detector. The duration of the trigger pulse can be adjusted via a not shown input of the monostable flip-flop 9.

Figure 4B:
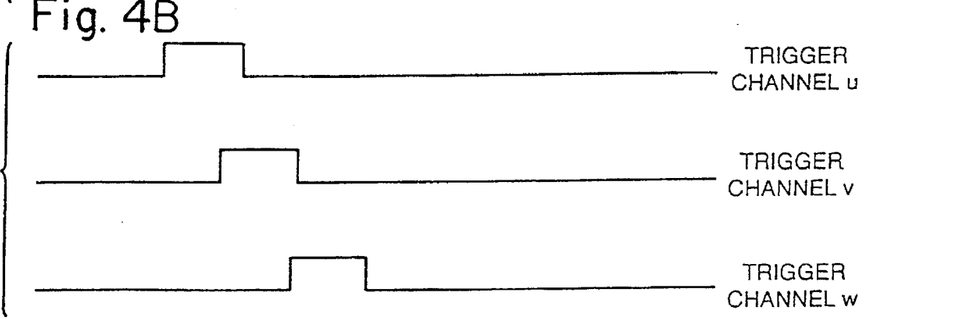
Figure 4C:
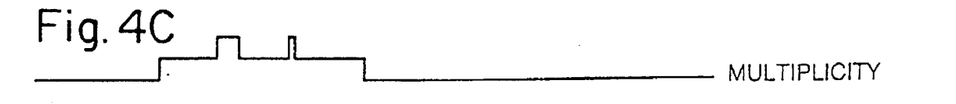
Figure 4D:
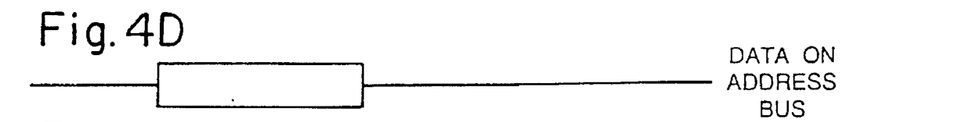

If, at the output of the flip-flop 9, a reset device 30, which resets the amplifier channel 10 at a stipulated time after the output signal c has been transmitted, is provided, this reset device 30 can be programmed in such a manner that the reset signal is given at a predetermined time after the amplifier channel 10 was triggered. Thus the reset condition is generated automatically and internally after the amplifier channel 10 is activated, thereby ensuring that there is always sufficient time to read any analog signal such as, e.g., a pulse amplitude value P. The pulse signal c on the output from an amplifier channel 10 is transmitted to a multiplicity generator 11 in FIG. 2. On the basis of the trigger pulses c as shown in FIG. 4B this multiplicity generator 11 generates so-called multiplicity signals MU. These multiplicity signals MU are differential signals, preferably a differential current which is proportional to the number of triggered amplifier channels in the x and y directions respectively. This is clearly illustrated in FIG. 4C which shows the multiplicity signal's proportionality with approximately coincident trigger signals c. This differential signal is transmitted, e.g., in the form of the differential current signal MU on the output from the multiplicity generator 11 in FIG. 2.

The trigger signals c from each channel are also transmitted to a digital/analog converter 12 in FIG. 2. This generates a differential signal which represents the position address of a triggered channel 10. The digital/analog converter 12 can work in current mode when it then transmits a differential current signal as position address. If the digital/analog converter 12 is connected to a memory 13 for the circuit-addresses, the circuit address of the circuit in which the triggered channel is located is led to the converter and added to the position address, i.e. the channel address. In the case in question, viz. with the digital/analog converter 12 working in current mode, fie circuit address is added to the channel address as a current contribution (most significant bit). The position addresses or channel addresses can be generated combinatorically in the digital/analog converter 12 in FIG. 2, thus enabling the current address which is thereby found to be stored in the form of data words in a table. The data words' bit length m,n will be determined by the number of channels, i.e. M+N, so that $2^m$=M and $2^n$=N. The position address with added circuit address is converted to a differential analog signal A which is provided on the output from the digital/analog converter 12, as illustrated in FIG. 2 and is transferred as a data signal on an address bus, the data signal being illustrated in FIG. 4D, to the imaging system's receiver unit. This receiver unit 3 is shown in more detail in FIG. 3 and comprises the components 14, 15 and 16.

Thus it can be seen fiat with the electronic imaging system according to the present invention the comparators 8, 9 in each amplifier channel 10 in FIG. 2 will continuously detect the amplified and filtered signal a which is produced on the output oft he amplifier 7. When the signal strength crosses the externally adjustable threshold voltage f of the comparator, the comparator will change. In other words the system is self-triggering. Moreover the trigger signal c from the flip-flop 9 can also be used to ensure that the information acquired by the detector unit, e.g. the position or an analog pulse amplitude value, is made available to a data acquisition system which is connected to the detector.

A system is conceivable wherein an amplifier channel or a front-end circuit which is triggered, transmits an interrupt signal to the data acquisition unit and thereafter a digital address is produced on the front-end circuit's output which can be read by the data acquisition unit. When the data acquisition unit has read the address, it transmits a reset signal to the circuit with the message that the read-out is now over. This conception however, presents a number of problems. The logical address which is obtained by a logic voltage transfer together with the reset signal which also has a logic voltage transition, generates noise in the environment and this may be recorded by the amplifier inputs which are charge sensitive. This causes problems if the threshold voltage in the comparator is set too low, while a higher threshold voltage will set a limit to the level for those signals which can be detected. However, the point of the exercise is to detect as small signals as possible. Furthermore a reset via the data acquisition unit might cause a restriction of the speed of the detection rate.

In the present invention, on the other hand, an analog differential signal is transmitted which uniquely represents a channel address. This signal can be an analog voltage or preferably an analog current. Instead of the circuit receiving an external reset signal after reading the data, a reset position is generated automatically after a certain time internally in the circuit. That means that any analog data are kept on the outputs from the amplifier channels during a period which can be controlled externally and is sufficient for reading the data. If at the same time a channel 10 in a front-end circuit 2 is triggered, the circuit will also generate an extra analog signal, preferably in the form of a current signal which is proportional to the number of channels which are encountered in an x direction or a y direction respectively. This signal is generated in the multiplicity generator 11 in FIG. 2 and is called the multiplicity signal MU. This is particularly important if several amplifier channels or front-end circuits are connected in parallel. In this case the signal from all channels or circuits will be connected in such a way that it is also possible to find out whether there is more than one signal at the same time in all circuits. This is illustrated in more detail in FIG. 4E where it can be seen that the combination of the multiplicity signal with the channel address which is generated on the address bus from the digital/analog converter 12 can be used in order to create a data signal V in the form of three non-coincident address signals which represent the address of each of the triggered amplifier channels, u, v, w in, e.g., an x direction. This signal shows no address overlap, but may validated according the separation distance of the address. It should be noted that FIGS. 4A–4E emphasize the multiplicity concept and not how the address signals are validated. In case of FIGS. 4A–4E it is likely that the event will be rejected, the multiplicity being larger than 1 (overlap of data or address bus).

It can be seen that all the signals produced by the detector unit are received in the form of analog signals, preferably current signals. These are shown in FIG. 1 as an optional analog pulse amplitude value P, an analog position address A and the analog multiplicity signal MU.

Figure 3:
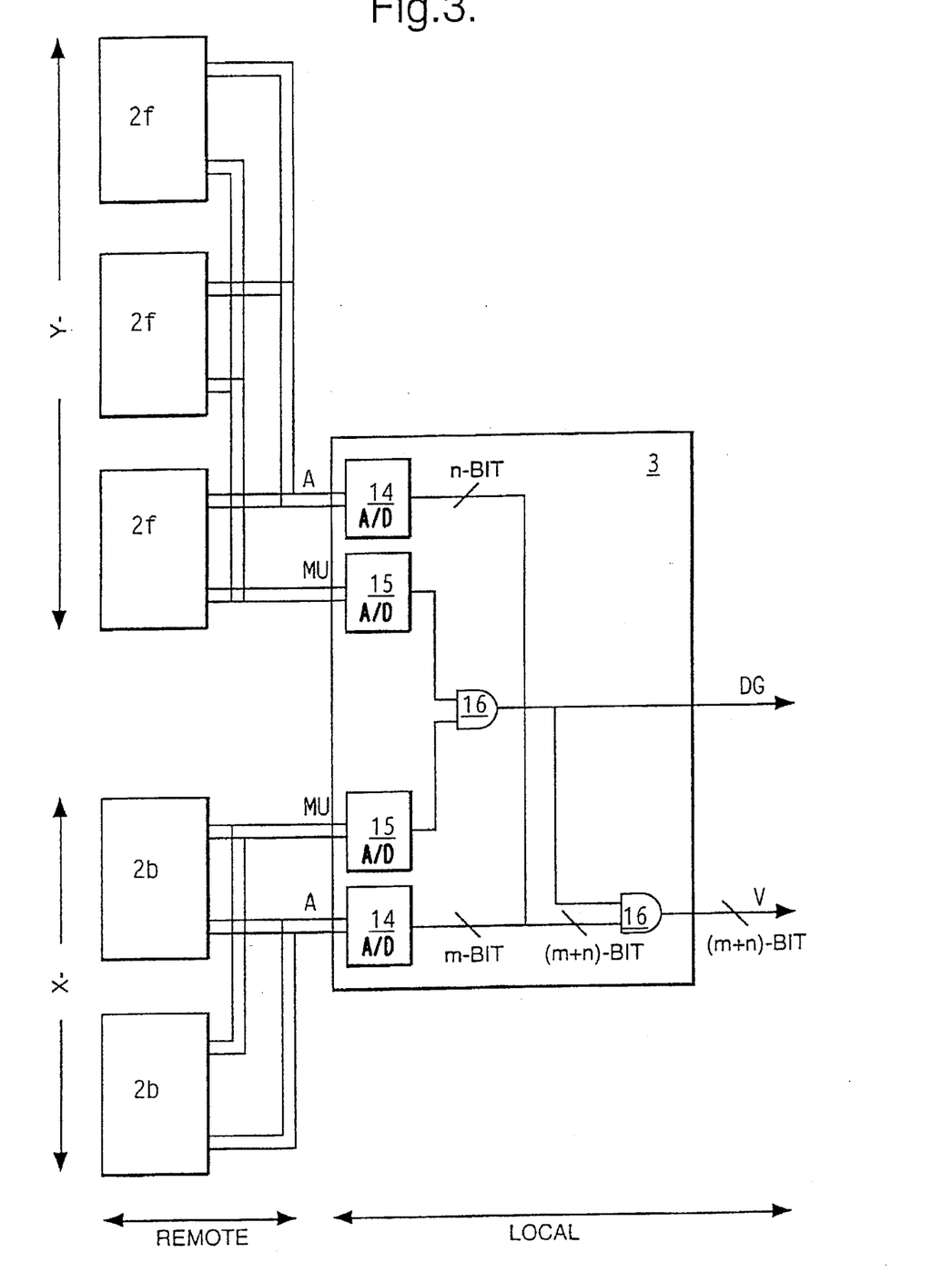
FIG. 3 is a block diagram of the central components of the detector unit according to the invention.
Figure 4E:
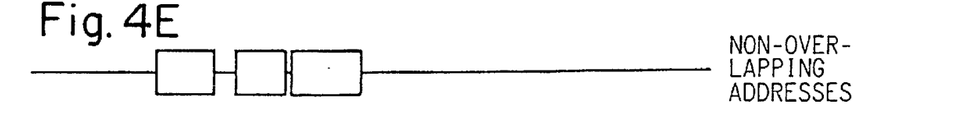

These signals are transmitted to the radiation imaging system's receiver unit which in FIG. 1 is denoted 3. The receiver unit is also partly illustrated in more detail in FIG. 3. As shown in FIG. 1 the receiver unit 3 comprises analog/digital converters 14; 15 which receive the analog address signal A and the multiplicity signal MU of an amplifier channel in the x direction and an amplifier channel in the direction y respectively, as illustrated in more detail in FIG. 3. The receiver unit 3 in reality constitutes an analog/digital interface connected to the outputs of the multiplicity generators 11 and the digital/analog converters 12 respectively. It will be understood that the receiver unit 3 can be provided at a great distance from the detector unit 1, 2. The receiver unit 3 can also comprise an analog/digital converter 6 as shown in FIG. 1 in order to convert the analog pulse amplitude signals P to digital signals in the form of a k-bits data word which is transferred to the computer interface 5. The channel addresses or position addresses A are converted to distal position addresses in the analog/digital converters 14 in the interface 3 in FIG. 1 and in FIG. 3 are shown indicated as an m-bit signal and an n-bit signal respectively on the output from the converters 14. The receiver unit 3 in FIG. 3 also comprises the analog/digital converter 15 which operates as a multiplicity tester testing the validity of the x position address and the y position address, whereafter the approved addresses are combined to form a two-dimensional address vector M+N which represents the x,y position of an event in the detector. The multiplicity testers 15 in FIG. 3 are connected to the output of the multiplicity generator 11 in FIG. 2 and generates the valid address signal as illustrated in FIG. 4E, this valid address signal being added to the address vector M+N in a combinator which is shown in FIG. 3 and comprises the AND circuits 16 connected to the output of the multiplicity testers 15 and the analog/digital converters 14 which provide the digital address signal respectively. The multiplicity tester 15 also transmits a validity signal DG to the computer interface 5 (FIG. 1). The validated address vector M+N is generated in the form of the distal signal V on the output from the receiver unit 3 in FIG. 3 and transferred to a computer interface 5, i.e. the input of a data processing unit which is used to generate a radiation imaging as recorded by the detector unit. This can be implemented, e.g., by the image being built up directly in the form of a matrix with picture elements as indicated by the two-dimensional address vector, M+N, this address vector which represents the x,y position in the detector unit, uniquely indicates the pixels which have to be used to generate the radiation imaging.

The multiplicity signal MU may also be recorded by each channel 10 or front-end circuits 2, blocking these from transmitting data to the receiver unit 3 if the multiplicity signal is greater than one, which indicates that another channel circuit already has claimed the common information bases, thus enabling the attainment of a larger speed/data rate.

If, however, a very high detection rate is used, the computer which is used to generate the completed image for display may not have the capacity to receive the large quantity of information.

In this case the problem can be solved by extending the receiver unit 3 with a histogram generator 4 as illustrated in FIG. 1. This histogram generator 4 consists of a memory with $2^{m+n}$, where $2^m$=M and $2^n$=N, storage cells and a simple arithmetical counter. The histogram generator 4 receives the address vector M+N from the combinator device 16 in the receiver unit and reads out a numerical value stored in the cell which is assigned to the respective address vector M+N. This value corresponds to the number of times a specific address vector M+N is received, i.e. the number of times in the course of a detection period that an event has occurred in the x,y position in the sensor element corresponding to the address vector M+N. The event count in the storage cell concerned is transferred to the arithmetical counter which increments the number by 1 and returns it to the same cell. Thereafter the histogram generator 4 can receive a new address vector M+N and the process is repeated sequentially until all the address vectors generated during a detection period have been received. Thus it will be seen that in the course of the detection period the cells in the memory will each be filled with histogram values which represent the number of events which have occurred in a specific x,y position in the detector. The image is hence also gradually built up in the course of the detection period. When the detection period is over or there is considered to be sufficient data to generate an image of the desired quality, the histogram values, i.e. the contents of the histogram generator's memory will be transferred to the computer and read into it in order to generate the imagaing for display. As already mentioned, there are capacity problems with regard to the data rate which can make it desirable to use a histogram generator 4. If the data rate runs into several MHz,it is virtually necessary to use a histogram generator 4 in preference to direct reading of the address vectors M+N to the computer.

In a practical embodiment the actual detector element can be designed with orthogonal stripe structures and a distance of 100 μm between each stripe. One possible arrangement could be, e.g., 192 stripe structures in the x direction and 256 stripe structures in the y direction, these numbers being integer multiples of 64 and the number of amplifier channels in each front-end circuit can therefore in practice be fixed, e.g., at 64, thus facilitating the combinatorical generation of channel addresses. Thus approximately 48,000 intersection points or detector diodes are also obtained between the orthogonal stripes, i.e. pixels which each correspond to an x,y position. All of this will be enable implementation on a detector surface of 1.92×2.56 cm. A practical application for a detector of this kind would be in dental radiography, since it is no larger than the films which are normally used for this purpose.

Further the electronic radiation imaging system according to the present invention may be advantageously applied to mammography, in a laboratory camera for small laboratory animals for, biomedical tissue imaging for mapping DNA structures, in a measurement apparatus for radiation dosimetry and surveillance, and in X-ray crystallgraphic imaging.

An electronic radiation imaging unit according to the present invention will have a a wide range of applications where X-ray based radiography is required. However, its application is not necessarily restricted to X-raying, since it can also be adapted to suit other types of high energy electromagnetic radiation or possibly also for image-generation based on the absorption of particles, i.e. pure particle radiation. A number of such variations will be obvious to a person skilled in the art and will be capable of implementation within the scope of the attached claims.

I claim:

1. An electronic radiation imaging system,comprising:
a detector unit; and
a receiver unit; wherein
the detector unit includes a two-dimensional sensor element made of a semi-conductor material with a front and a back, wherein on the front are provided M parallel stripes and on the back N corresponding parallel stripes, orientated at an angle to the M parallel stripes on the front, are provided, the sensor element thus forming an orthogonal x,y detector, wherein the M+N stripes constitute M×N diodes which are biased in the reverse direction, and M+N parallel amplifier channels connected with each of the M×N diodes respectively, wherein each amplifier channel includes an amplifier connected to a self-triggering comparator, the amplifier channels thus constituting one or more monolithically integrated front-end circuits which form a read-out device, the self-triggering comparator in each amplifier channel includes a discriminator and a monostable flip-flop, a first input of the discriminator being connected to the output of the amplifier, a second input of the discriminator being connected to the receiver unit for external adjustment of the discriminator's threshold voltage and an input on the monostable flip-flop being connected to the output of the discriminator;

the detector unit further including a multiplicity generator with M+N inputs connected to each of the M+N amplifier channels respectively via the output of the monostable flip-flop, the multiplicity generator being arranged to generate first differential signals for the x and y directions respectively with values proportional to the number of triggered amplifier channels M, N in each direction and provide the first differential signals at an output thereof;

the detector unit also including a digital/analog converter with M+N inputs which similarly are connected to each of the M+N amplifier channels via the output of the monostable flip-flop and adapted to generate second differential signals which represent the address of a triggered amplifier channel and to provide the second differential signals in the form of an analog channel address signal at an output thereof; and wherein the receiver unit includes an analog/digital interface connected to the output of the multiplicity generator and the digital/analog converter respectively in the detector unit, the analog/digital interface including two analog/digital converters which receive and convert the channel address signals of respective first and second digital position addresses which represent an x position corresponding to a triggered M channel and a y position corresponding to a triggered N channel respectively, two multiplicity testers connected to the output of the multiplicity generator and the outputs of the analog/digital converters respectively, the multiplicity testers determining whether the channel addresses m,n are a valid x,y position address, and a combinator device connected with the output of the analog/digital converters and the multiplicity testers in order to combine the x position address and the y position address respectively to form a two-dimensional address vector m+n which represents the x,y position in the detector unit, and at its output provides a valid address vector m+n to a data processing device for generation of the imaging recorded by the detector unit.

2. An electronic imaging system according to claim 1, wherein each amplifier channel including a pulse amplitude detector, the pulse amplitude detector being adapted to detect the pulse amplitude of the amplifier signal in a triggered channel in the form of an analog pulse amplitude signal and transmit the analog pulse amplitude signal to an output for the pulse amplitude detected in one of the M and N amplifier channels respectively, and that the detector unit's pulse amplitude outputs are connected to the input of corresponding analog/digital converters in the receiver unit, and the pulse amplitude signals being converted to digital signals and transferred to the data processing device.

3. An electronic radiation imaging system according to claim 2, wherein a programmable reset device for resetting a corresponding amplifier channel is connected to the output of each monostable flip-flop, reset may take place at a stipulated time after the amplifier channel has been triggered, thus providing a period sufficient for detecting any analog data, said stipulated time being externally adjustable.

4. An electronic radiation imaging system according to claim 1, wherein the detector unit includes two or more front-end circuits which form the read-out device, each frontend circuit is assigned a circuit address stored in an internal read-only memory connected to the digital/analog converter for read-out, the circuit address being combined with the differential signal which represents the address of a triggered amplifier channel in the front-end circuit concerned.

5. An electronic radiation imaging system according to claim 1, wherein the multiplicity tester includes the combinator device.

6. An electronic radiation imaging system according to claim 1, wherein the receiver unit further includes a histogram generator whose input is connected to the output of the multiplicity tester and the output of the data processing device the histogram generator includes a memory with $2^{m+n}$ storage cells and an arithmetical counter, wherein $2^m$=M and $2^n$=N, and each of the $2^{m+n}$ storage cells is assigned a respective valid address vector m+n for an x,y position and adapted for storing via the counter a numerical value corresponding to the number of times the respective valid address vector is generated in the course of a detection period.

7. Use of an electronic radiation imaging system according to claim 1, in a dental radiography apparatus.

8. Use of an electronic radiation imaging system according to claim 1, in a mammogaphic apparatus.

9. Use of an electronic radiation imaging system according to claim 1, in a radiation apparatus for laboratory animals.

10. Use of an electronic radiation imaging system according to claim 1, in biomedical tissue imaging.

11. Use of an electronic radiation imaging system according to claims 1, in a measurement apparatus radiation surveillance.

12. Use of an electronic radiation imaging system according to claims 1, in an apparatus for X-ray crystallographic imaging.

13. A radiation imaging system, comprising:
a detector unit, the detector unit including,
a two-dimensional sensor formed of a semiconductor material and having first and second sensing elements, the first sensing elements sensing radiation in a first direction and the second sensing elements sensing radiation in a second direction, the two-dimensional sensor including first parallel electrode stripes formed on a front surface of the semiconductor material and second parallel electrode stripes formed on a back surface of the semiconductor material, the first and second parallel electrode stripes forming the first and second sensing elements and being orthogonal to one another,
first amplifier channels corresponding to each of the first sensing elements, each first amplifier channel generating an output signal based on a detection output from a corresponding one of the first sensing elements,
second amplifier channels corresponding to each of the second sensing elements, each second amplifier channel generating an output signal based on a detection output from a corresponding one of the second sensing elements,
a first multiplicity generator connected to each of the first amplifier channels, and generating a first multiplicity signal representing a number of the first amplifier channels generating output signals,
a second multiplicity generator connected to each of the second amplifier channels, and generating a second multiplicity signal representing a number of the second amplifier channels generating output signals,
a first address generator receiving the output signals from each of the first amplifier channels, and generating a first analog address of a first amplifier channel associated with a received output signal,
a second address generator receiving the output signals from each of the second amplifier channels, and generating a second analog address of a second amplifier channel associated with a received output signal; and
a receiver unit for providing output to a data processing device for generation of the imaging recorded by the detector unit, the receiver unit including,
converting means for converting the first analog address into a first digital address, and converting the second analog address into a second digital address, and
testing means for testing whether the first and second digital addresses represent a valid position address in the first and second direction based on the first and second multiplicity signals.

14. The system of claim 13, wherein at least one of the first and second amplifier channels comprise a self-triggering comparator which generates an output signal based on a comparison of output from a corresponding one of the first and second sensing elements with a threshold value.

15. The system of claim 13, wherein each self-triggering comparator comprises:
a flip-flop; and
a discriminator which compares the output from a corresponding one of the first and second sensing elements with a threshold value, and when the output from a corresponding one of the first and second sensing elements exceeds the threshold value triggers the flip-flop to generating an output signal.

16. The system of claim 13, further comprising:
a combinator combining the first and second digital addresses to form-a two-dimensional address vector.

17. The system of claim 16, further comprising:
a histogram generator generating a histogram of two-dimensional address vectors output by the combinator.

18. The system of claim 13, further comprising:
a pulse amplitude detector connected to at least one of the first and second channel amplifiers, and outputting, when the at least one of the first and second channel amplifiers is triggered, a signal representing a pulse amplitude of output from a corresponding one of the first and second sensing elements.

19. The system of claim 18, further comprising:
a reset device resetting the triggered one of the first and second channel amplifiers a predetermined period of time after triggering.

20. The system of claim 13, further comprising:

a histogram generator generating a histogram of the position addresses represented by each pair of first and second digital addresses.

21. A radiation imaging system, comprising:

a detector unit, the detector unit including,
- a two-dimensional sensor formed of a semiconductor material and having first and second sensing elements, the first sensing elements sensing radiation in a first direction and the second sensing elements sensing radiation in a second direction, the two-dimensional sensor including first parallel electrode stripes formed on a front surface of the semiconductor material and second parallel electrode stripes formed on a back surface of the semiconductor material, the first and second parallel electrode stripes forming the first and second sensing elements and being orthogonal to one another,
- at least two first front end circuits, each first front end circuit including,
- first amplifier channels corresponding to the first sensing elements, each first amplifier channel generating an output signal based on a detection output from a corresponding one of the first sensing elements,
- a first multiplicity generator connected to each of the first amplifier channels, and generating a first multiplicity signal representing a number of the first amplifier channels generating output signals, and
- a first address generator receiving the output signals from each of the first amplifier channels, and generating a first analog address of a first amplifier channel associated with a received output signal,
- at least two second front end circuits, each second front end circuit including,
- second amplifier channels corresponding to the second sensing elements, each second amplifier channel generating an output signal based on a detection output from a corresponding one of the second sensing elements,
- a second multiplicity generator connected to each of the second amplifier channels, and generating a second multiplicity signal representing a number of the second amplifier channels generating output signals,
- a second address generator receiving the output signals from each of the second amplifier channels, and generating a second analog address of a second amplifier channel associated with a received output signal; and
- a receiver unit, electrically connected to each first and second front end unit, for providing output to a data processing device for generation of the imaging recorded by the detector unit, the receiver unit including,
- converting means for converting the first analog address into a first digital address, and converting the second analog address into a second digital address, and
- testing means for testing whether the first and second digital addresses represent a valid position address in the first and second direction based on the first and second multiplicity signals.

22. The system of claim 21, wherein each first front end circuit further includes a memory storing a circuit address of the first front end circuit, and wherein the first address generator determines a first sensing element address for a first sensing element corresponding to one of the first channel amplifiers generating an output signal, the first sensing element address being an address of the first sensing element with respect to other first sensing elements connected to the first channel amplifiers in the first front end circuit, and the first address generator combines the circuit address for the first front end circuit with the first sensing element address to generate the first analog address which represents the address of the first sensing element with respect to other first sensing elements of the two-dimensional sensor; and each second front end circuit further includes a memory storing a circuit address of the second front end circuit, and wherein the second address generator determines a second sensing element address for a second sensing element corresponding to one of the second channel amplifiers generating an output signal, the second sensing element address being an address of the second sensing element with respect to other second sensing elements connected to the second channel amplifiers in the second front end circuit, and the second address generator combines the circuit address for the second front end circuit with the second sensing element address to generate the second analog address which represents the address of the second sensing element with respect to other second sensing elements of the two-dimensional sensor.

* * * * *